United States Patent
Kollata et al.

(10) Patent No.: US 12,220,928 B2
(45) Date of Patent: Feb. 11, 2025

(54) DROP PLACEMENT ANALYZER FOR INKJET PRINTING SYSTEM

(71) Applicant: Kateeva, Inc., Newark, CA (US)

(72) Inventors: Eashwer Chandra Vidhya Sagar Kollata, Fremont, CA (US); Gregory Lewis, Mountain View, CA (US); Alexander Sou-Kang Ko, Santa Clara, CA (US)

(73) Assignee: Kateeva, Inc., Newark, CA (US)

( * ) Notice: Subject to any disclaimer, the term of this patent is extended or adjusted under 35 U.S.C. 154(b) by 89 days.

(21) Appl. No.: 17/819,756

(22) Filed: Aug. 15, 2022

(65) Prior Publication Data
US 2023/0062927 A1    Mar. 2, 2023

Related U.S. Application Data

(60) Provisional application No. 63/260,641, filed on Aug. 27, 2021.

(51) Int. Cl.
*B41J 2/045* (2006.01)
*B41J 25/00* (2006.01)
*G01B 11/00* (2006.01)

(52) U.S. Cl.
CPC ........... *B41J 25/00* (2013.01); *B41J 2/04505* (2013.01); *B41J 2/04558* (2013.01); *G01B 11/002* (2013.01)

(58) Field of Classification Search
CPC ......... B41J 11/0045; B41J 11/02; B41J 11/04; B41J 11/06; B41J 11/13
See application file for complete search history.

(56) References Cited

U.S. PATENT DOCUMENTS

| 5,477,373 A | * | 12/1995 | Nakamura | G02B 26/126 347/261 |
| 2006/0049369 A1 | * | 3/2006 | Meinhart | G01N 15/1427 250/573 |
| 2012/0162301 A1 | * | 6/2012 | Honoki | B41J 13/103 347/104 |
| 2015/0373305 A1 | * | 12/2015 | Hauf | G06T 7/0004 118/712 |
| 2018/0146162 A1 | | 5/2018 | Hauf | |
| 2018/0257099 A1 | | 9/2018 | Miyazaki et al. | |
| 2022/0169049 A1 | * | 6/2022 | Kuo | B41J 11/008 |

FOREIGN PATENT DOCUMENTS

| TW | 201506095 A | 2/2015 |
| TW | 201731135 A | 9/2017 |

OTHER PUBLICATIONS

International Search Report and Written Opinion issued Nov. 23, 2022 for International Patent Application No. PCT/US2022/074789.
Office Action issued Jan. 31, 2024 in TW Patent Application No. 111130580.

* cited by examiner

*Primary Examiner* — Scott A Richmond
(74) *Attorney, Agent, or Firm* — Hauptman Ham, LLP (57) ABSTRACT

A drop placement analyzer for an inkjet printer is described herein. The drop placement analyzer comprises a film support that has an opaque, optically non-interfering vacuum surface for immobilizing a film against the optically non-interfering vacuum surface and photographing drops disposed on the film from the same side of the film on which the drops are disposed.

19 Claims, 6 Drawing Sheets

DROP PLACEMENT ANALYZER FOR INKJET PRINTING SYSTEM

CROSS-REFERENCE TO RELATED APPLICATIONS

This application for patent claims benefit of U.S. Provisional Patent Application Ser. No. 63/260,641 filed Aug. 27, 2021, which is entirely incorporated herein by reference.

FIELD

This patent application concerns inkjet printing, units for analyzing accuracy of drop placement for inkjet printers, and substrate for such test units.

BACKGROUND

Industrial inkjet printers are used to apply materials to large substrates to form devices of all kinds. The substrates can be rigid or flexible, thick or thin, and can be made of an array of materials. The most common types of substrates used in this way are substrates made of various types of glass, which are processed to make electronic displays such as televisions and displays for smart phones.

An inkjet printer uses a printhead with nozzles that dispense a print material for deposition onto a substrate. Today's industrial inkjet printers deposit very small droplets of print material with extremely high accuracy to form very small, or very thin, precisely located structures on the substrate. To ensure accurate placement of droplets on the substrate, operating characteristics of each nozzle, and changes thereto, must be known at all times. For this reason, a number of diagnostic modules are typically used to measure and track performance of the nozzles.

One such diagnostic modules is a drop placement accuracy module. The drop placement accuracy module provides a surface on which the printhead deposits drops, which are subsequently photographed and analyzed using image processing software to determine where the drops were placed and dimensions of the placed drops. Such data is then compared to other data, such as past results, expected drop location and size, and the like to guide print planning using the nozzles.

Because the drops deposited on the surface of the drop placement accuracy module are very small, surfaces around the drops can give rise to noise and distortion of images, leading to uncertainty about drop placement and dimension. Accuracy is critical to reliable operation of industrial inkjet printers, so minimizing such sources of noise and image distortion is also critical.

SUMMARY

Embodiments described herein provide an inkjet printer, comprising a processing table; a printhead coupled to a printhead support disposed over the processing table; and a drop placement analyzer with a film support that has an opaque, optically non-interfering surface for photography of drops disposed on a film supported by the film support.

Other embodiments described herein provide a drop placement analyzer for an inkjet printer, the drop placement analyzer comprising a film support that has an opaque, optically non-interfering vacuum surface for immobilizing a film against the optically non-interfering vacuum surface and photographing drops disposed on the film.

Other embodiments described herein provide a method of processing a substrate, comprising providing a support body that has a flat, opaque, optically non-interfering surface; disposing a transparent test substrate securely against the optically non-interfering surface of the support body; dispensing test drops onto the test substrate; illuminating the test substrate using light adapted for use with the optically non-interfering surface of the support body to minimize noise and distortion of light reflected from the optically non-interfering surface of the support body; and photographing the test drops on the test substrate.

DETAILED DESCRIPTION

A drop placement accuracy module for an inkjet printer is described herein. The drop placement accuracy module has a surface for supporting a film substrate. The film substrate receives drops of print material from a printhead of the inkjet printer, and the surface of the drop placement accuracy module supports the film substrate in a flat orientation for accurate placement of drops and accurate photography of placed drops. The surface is configured to minimize optical noise and/or distortion that can complicate image processing of drops photographed from the same side of the film substrate on which the drops are deposited, wherein the film substrate may be transparent or translucent. The surface is configured with no, or minimal, features that can be resolved by the image capture system through the film.

Figure 1:
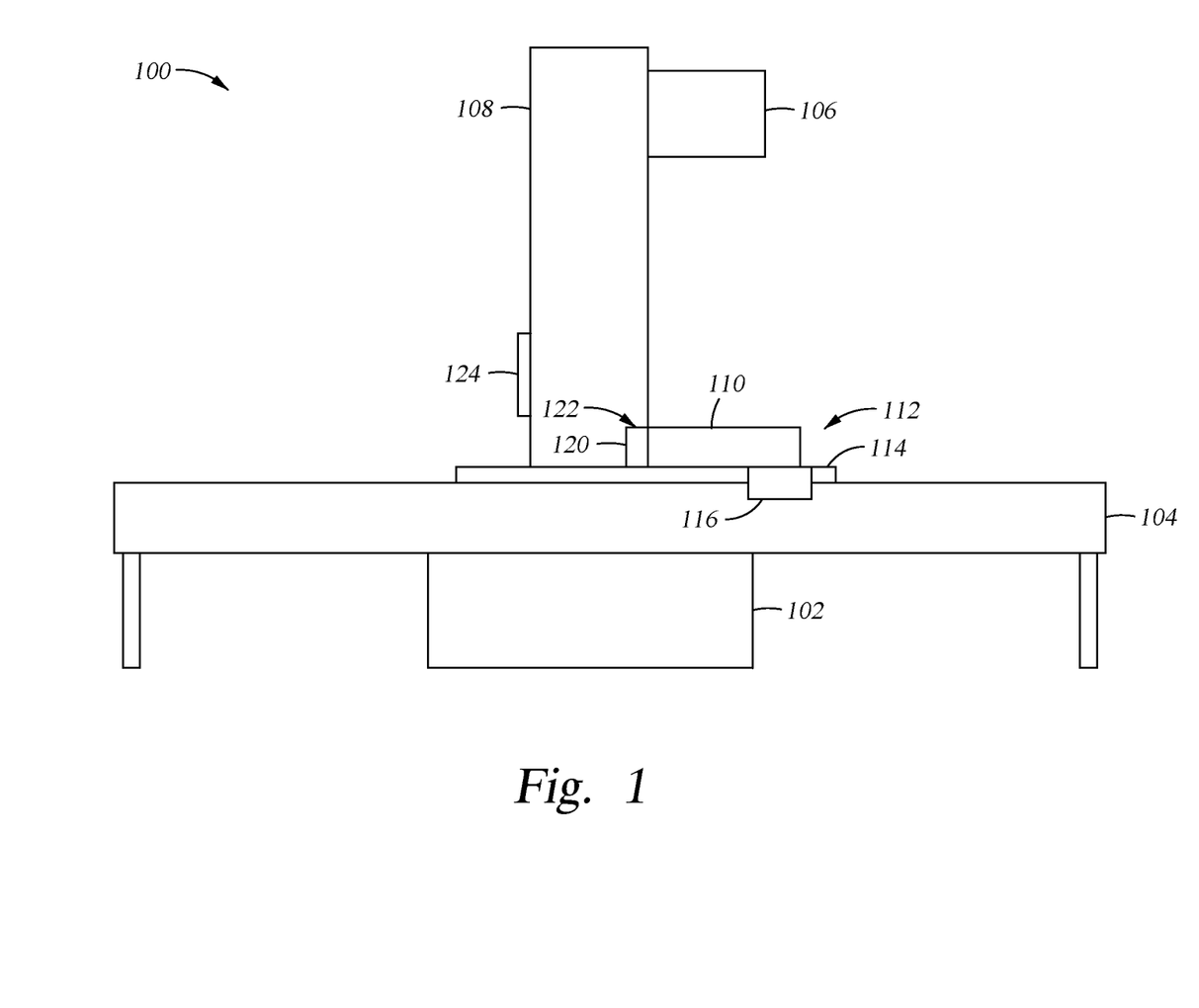
FIG. 1 is a schematic elevation view of an inkjet printing system according to one embodiment.

FIG. 1 is a schematic elevation view of an inkjet printing system 100 according to one embodiment. The inkjet printing system 100 has a base 102 that supports a processing table 104. The processing table 104 generally supports a substrate for deposition of print material. A printhead 106 is supported above the processing table 104 by a printhead support 108, which extends across the processing table 104. The printhead 106 moves along the printhead support 108 across the processing table 104 while the substrate is generally moved along the processing table 104 in a direction perpendicular to the direction of motion of the printhead 106. Thus, the substrate and printhead 106 move in perpendicular directions, enabling the printhead 106 to reach all areas of the substrate where deposition of print material is desired. The direction in which the printhead 106 moves can be called the "x-axis," and the direction in which the substrate is moved can be called the "y-axis. In one case, the processing table 104 includes a gas float system (not shown) that forms a gas cushion between the substrate and the processing table 104, and the printing system 100 includes a substrate holder (not shown) to position the substrate on the processing table 104.

The printing system 100 includes a printhead management station 110, which is located at a side of the processing table 104 near the printhead support 108 to provide access to the printhead. The printhead management station 110 may include a plurality of modules for assessing printhead performance. The printhead management station 110 may be coupled to a linear motion system 112 that moves the printhead management station 110 in a direction parallel to the y-axis. The linear motion system 112 can include a track 114 to which the printhead management station 110 couples, and a linear actuator 116 to move and position the printhead management station 110 along the track for one or another module of the printhead management station 110 to access the printhead 106. The printhead 106 generally moves to the side of the processing table 104 where the printhead management station 110 is located to perform a diagnostic or maintenance task.

The printhead management station 110 includes a drop placement analyzer 120. The drop placement analyzer 120 has an optically non-interfering surface 122 that facilitates taking sharp, clear photographs of drops placed on a light transmitting film supported by the surface 122, where the photographs are taken from the same side of the film on which the drops are placed. The surface is opaque and reflective. "Optically non-interfering," here, means that the surface 122 does not add significant distortion or noise to reflected light when light incident on the surface is not otherwise incompatible with the surface in some way. That is to say, distortion and noise in the reflected light is not enough to add significant error to determining the location and dimension of drops photographed using the reflected light. The incident light is directed toward the side of the light transmitting film, which may be transparent or translucent, on which the drops are placed. Use of transparent film with a reflective film support surface can be useful, for example, when imaging drops of clear, colorless fluid.

Some of the incident light travels through the film and is reflected from the film support surface of the drop placement analyzer, traveling back through the film along. A camera 124 is coupled to the printhead 106 or to the printhead support 108 in an orientation facing downward toward the surface 122, and the film supported thereon, to photograph drops deposited on the film from the same side of the film on which the drops are deposited. In this case, the camera 124 is coupled to the printhead support 108 so that the printhead 106 can be deployed elsewhere while photographs of deposited drops are captured. In some cases, the camera 124 may be coupled to a motion system (not shown) to allow positioning or scanning of the camera 124 while photographs are taken.

Figure 2A:
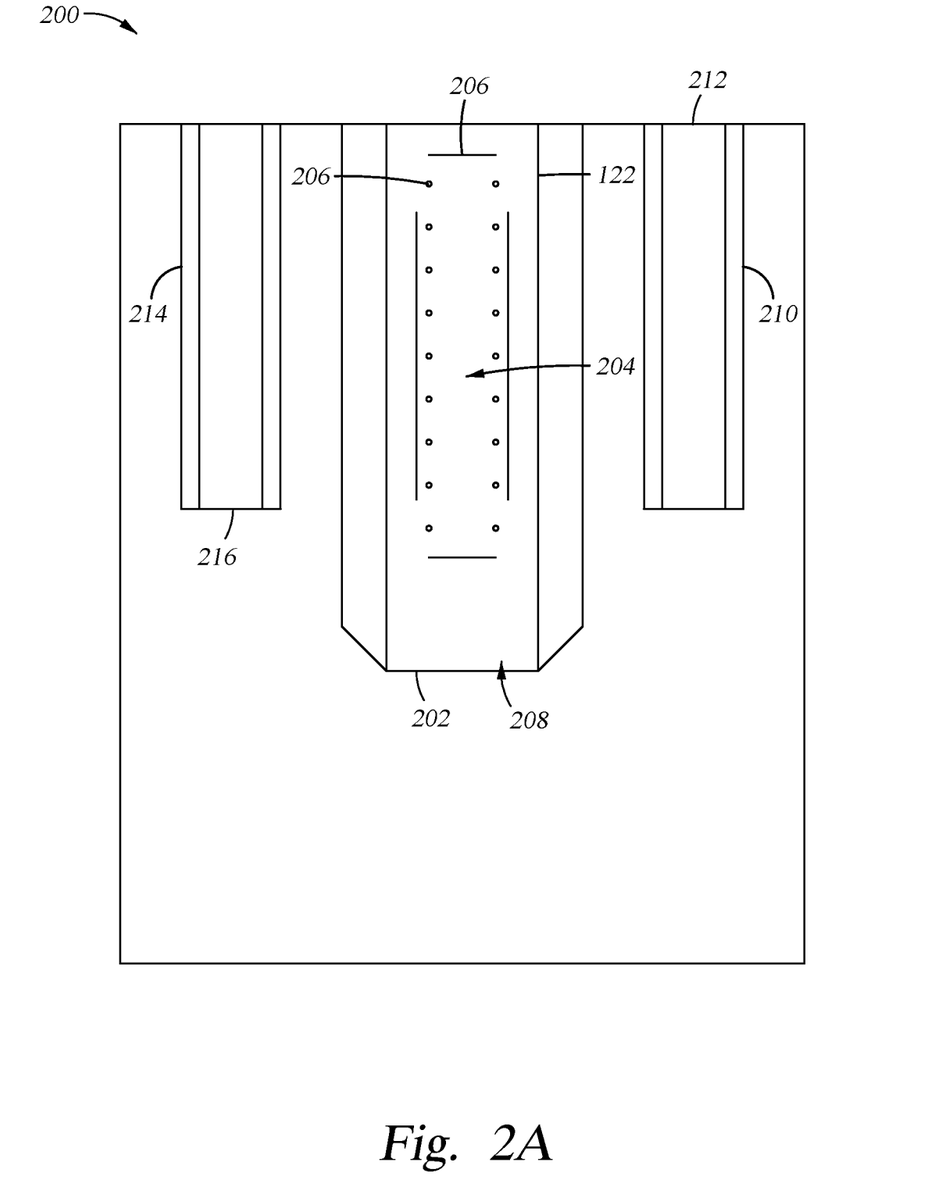
FIGS. 2A-2C are each top views of different embodiments of drop placement analyzers.

FIG. 2A is a top view of a drop placement analyzer 200 according to one embodiment. The drop placement analyzer 200 is configured to photograph drops placed on a film in a similar orientation to the drop placement analyzer 120, namely from the same side of the film on which the drops are placed. The drop placement analyzer 200 includes a film support 202 that has the optically non-interfering surface 122. The film support 202 has a film placement area 204 that supports a film for receiving drops from the printhead 106 (FIG. 1). The film placement area 204 features a plurality of openings 206 to apply suction between the film support 202 and the film to immobilize and flatten the film while drops are deposited and photographs are taken. The optically non-interfering surface 122 is disposed on a functional side 208 of the film support that is generally oriented toward the printhead 106 and camera 124 (FIG. 1) when the drop placement analyzer 200 is mounted to the printhead management station 110. The film is generally a transparent flexible material that is supplied on a supply roll (not shown) placed within the drop placement analyzer 200 and routed, through a supply slot 210 and positioned by a supply roller 212, across the film support 202, through a take-up slot 214 by a take-up roller 216, to a take-up roll (not shown) also disposed within the drop placement analyzer 200. As portions of the film are used for drop placement analysis, the film is advanced to position unused film adjacent to the film placement area 204 of the film support 202.

The optically non-interfering surface 122 of the film support 202 is generally reflective. In one case, the film support 202 is made of aluminum and the optically non-interfering surface 122 is nickel plated. The nickel plating may be any suitable thickness, and in one example the nickel plating is 0.001 inches thick. In one case, the nickel plated area has a total flatness of no more than about 2 µm, a specific flatness of no more than about 1 µm per 25 mm length, and an $R_a$ roughness of no more than about 0.025 µm or 1 µ-inch.

In the above embodiment, the film placement area 204 of the film support 202 can be described as having a "mirror finish." The aluminum surface beneath the nickel plate is machined to a total flatness of at least about 5 µm, specific flatness at least about 2 µm per 25 mm length, and $R_a$ roughness, measured by profilometer, of no more than about 0.8 µm or about 32 µ-inch. The surface is then lapped to a total flatness of at least about 3 µm, for example about 1 µm, specific flatness at least about 2 µm per 25 mm length and $R_a$ roughness no more than about 0.05 µm or 2 µ-inch. Nickel plating is applied to a thickness of about 0.001 inches, and then lapped to a total flatness at least about 2 µm, for example about 1 µm, specific flatness at least about 1 µm per 25 mm length, and $R_a$ roughness of no more than about 0.025 µm or 1 µ-inch. The mirror surface described above may have optically resolvable features of dimension no more than about 1 µm.

Figure 2B:
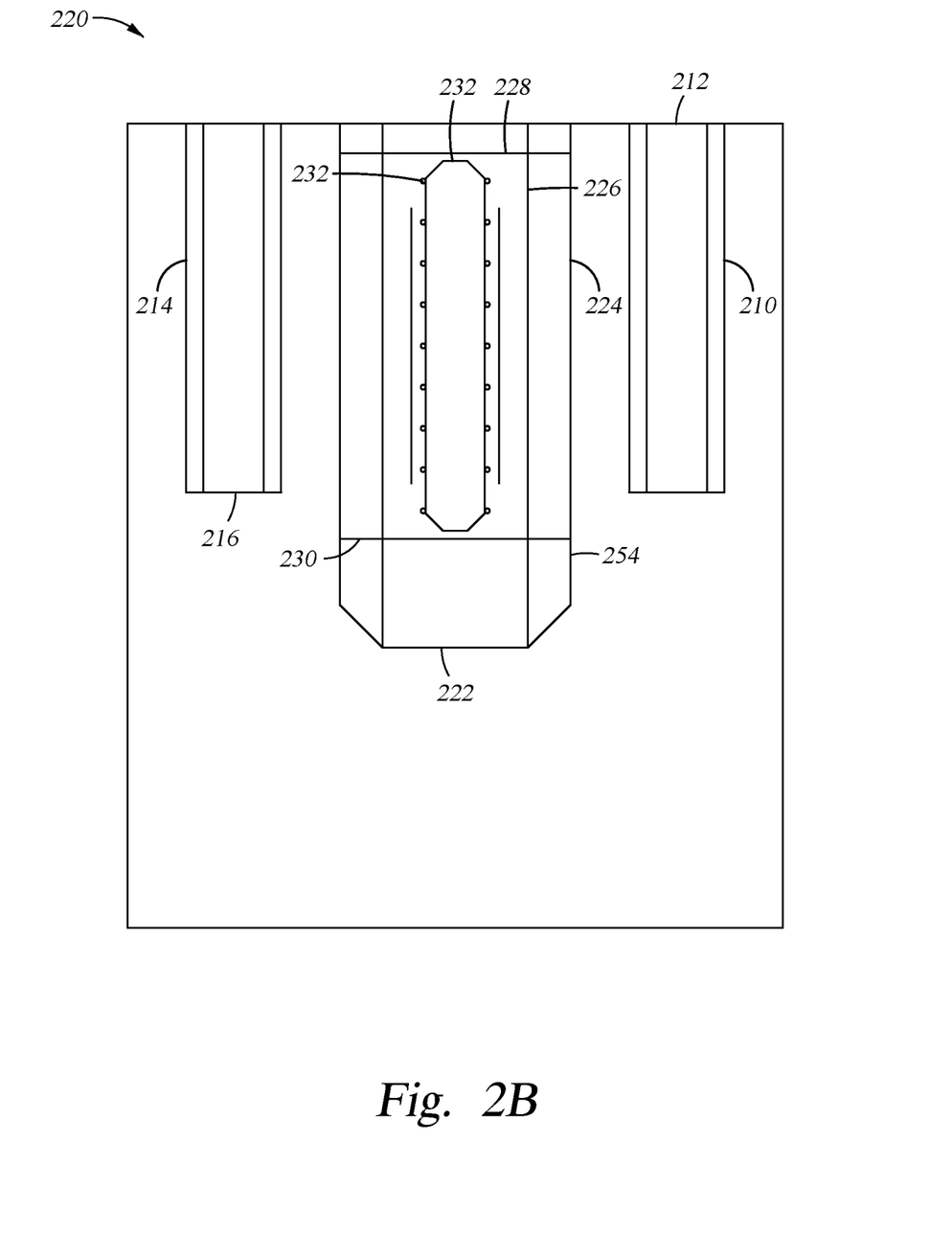

FIG. 2B is a top view of a drop placement analyzer 220 according to another embodiment, also configured for photography of drops placed on a film from the same side of the film on which the drops are placed. In this case, a film support 222 comprises a base member 224 and a glass body 226. The glass body 226 engages with the base member 224 to support a test substrate for receiving drops and photographing the drops. The glass body 226 provides the optically non-interfering surface in this case. The glass body 226 has a highly reflective coating that is configured to minimize optical interference. The highly reflective coating may have reflectivity of more than about 90%. To make the glass body 222, the glass upper surface of the glass body 222 is machined and lapped to match the light to be used for imaging drops. For example, the surface is machined and lapped to a specific flatness of one-quarter wavelength over one inch length, or a total flatness of 1 wavelength over the critical area.

In this case, the glass body 222 provides the entire film placement area, which is the critical area for flatness. The glass body 222 extends from one side of the base member 224 to an opposite side thereof, and along the length of the base member 224 from a first wall 228 to a second wall 230, where the film placement area is between the first and second walls 228 and 230. The base member 224 and the glass body 222 have matching openings 232 for application of suction to the reflective surface of the glass body 222.

Figure 2C:
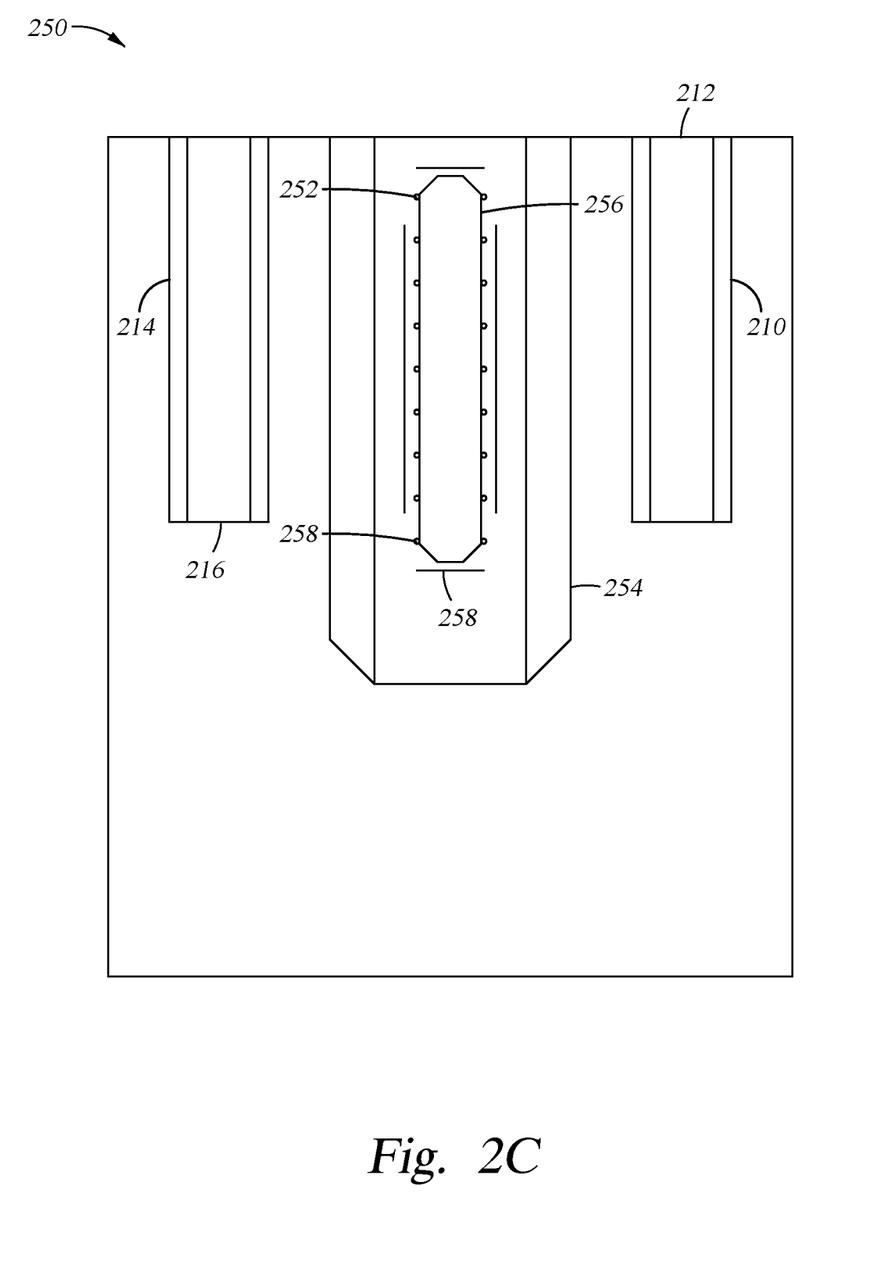

FIG. 2C is a top view of a drop placement analyzer 250 according to another embodiment. The drop placement analyzer 250 has a reflective insert body that provides the optically non-interfering surface. In this case, the optically non-interfering surface is provided as a crystalline silicon body 252 that engages with a base member 254 that is slightly different from the base member 224. The silicon body 252 is configured as a sheet-like body that in one case is configured to have 70-80% reflectivity of photons having wavelength of 650 nm. The silicon body 252 is configured to fit in a pocket 256 in the upper surface of the base member 254. The base member 254 has openings 258 for application of suction, and the pocket 256 is between the openings 258, such that the silicon body 252, and the surrounding upper surface of the base member 254, define the film placement area of the analyzer 250.

It should be noted that using a detachable body to provide the optically non-interfering surface of the film support allows the body to be changed such that the properties of the body can be selected depending on the light that is to be used to image drops. Different detachable bodies can be configured and optimized for different light, where the light itself is selected based on characteristics, such as color and reflectivity, of the drops to be imaged. Where the print material being deposited by the inkjet printing system is changed, it may be advantageous to change the detachable body to a different material to provide a more suitable material for imaging the drops.

The detachable bodies described above can be made from any suitable material, so long as the material can provide a reflective surface that is compatible with the drops being imaged and the light being used for imaging the drops. The detachable bodies can be made of metal, plastic, ceramic, or any other suitable material to which a reflective surface can be applied or formed. The reflective surface of the detachable body can be configured to reflect a desired spectrum or color of light in some cases, where doing so would be helpful for imaging.

Figure 3:
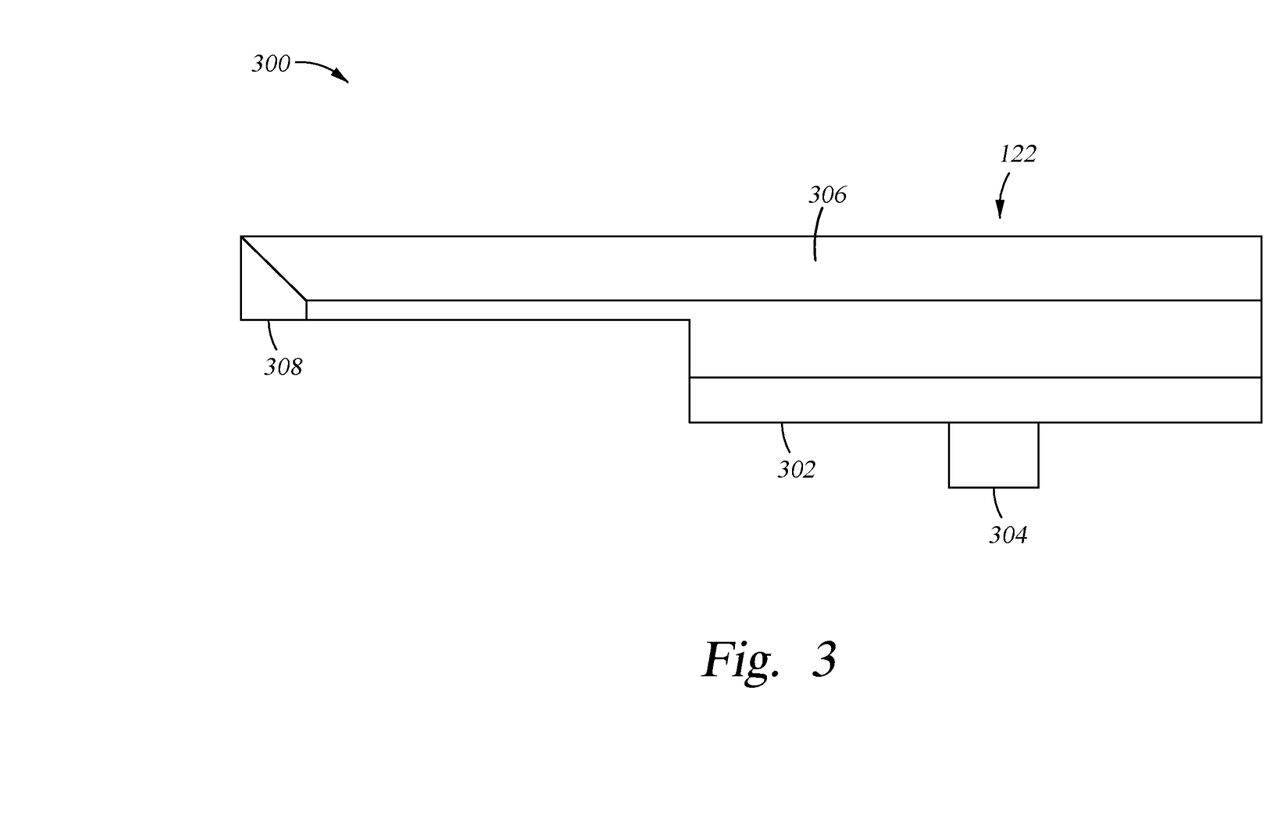
FIG. 3 is an elevation view of a film support of a drop placement analyzer according to one embodiment.

FIG. 3 is an elevation view of a film support 300 according to one embodiment. The film support body 300 has the optically non-interfering surface 122 described above, which can be any of the previously-describe embodiments. The film support 300 has a cover plate 302 attached to a side of the film support opposite from the optically non-interfering surface 122. The cover plate 302 and the side of the film support 300 opposite from the optically non-interfering surface define an interior plenum (not shown). A gas fitting 304 is coupled to the cover plate 302 to provide fluid communication with the plenum. The openings such as the openings 206 (not shown) in the optically non-interfering surface 122 provide fluid communication from the plenum to the optically non-interfering surface 122. The gas fitting 304 may be used to apply suction to the optically non-interfering surface 122. A vacuum source is coupled to the gas fitting 304 to lower the pressure between the film substrate and the surface 122. The reduced pressure urges the film substrate toward the surface 122 to immobilize and flatten the film substrate against the surface 122. Optionally, where it is useful to encourage the film substrate to disengage from the surface 122 after processing, positive pressure can be applied through the gas fitting 304 to separate the film substrate from the surface 122.

All the film supports described above are elongated members that protrude laterally to provide a support surface for a test substrate. The film supports are generally oriented to extend in a direction parallel to the x-axis, as described in connection with FIG. 1, and can extend either toward, or away from, the processing table 104. On the upper surface of each film support described above, the long edge of the film support is beveled to provide a sloping engagement and disengagement surface for the test substrate at the upper surface of the film support. In the case of FIG. 2B, the bevel is incorporated in the glass body 222, while in the embodiment of FIG. 2A the bevel is incorporated in the aluminum upper surface of the film support, and in the embodiment of FIG. 2C the bevel is incorporated in the upper surface of the base member 252. Each film support also has a beveled distal end. In the example of FIG. 3, the bevel of the long edge of the film support 300 is at 306 and the beveled distal end is at 308.

Figure 4:
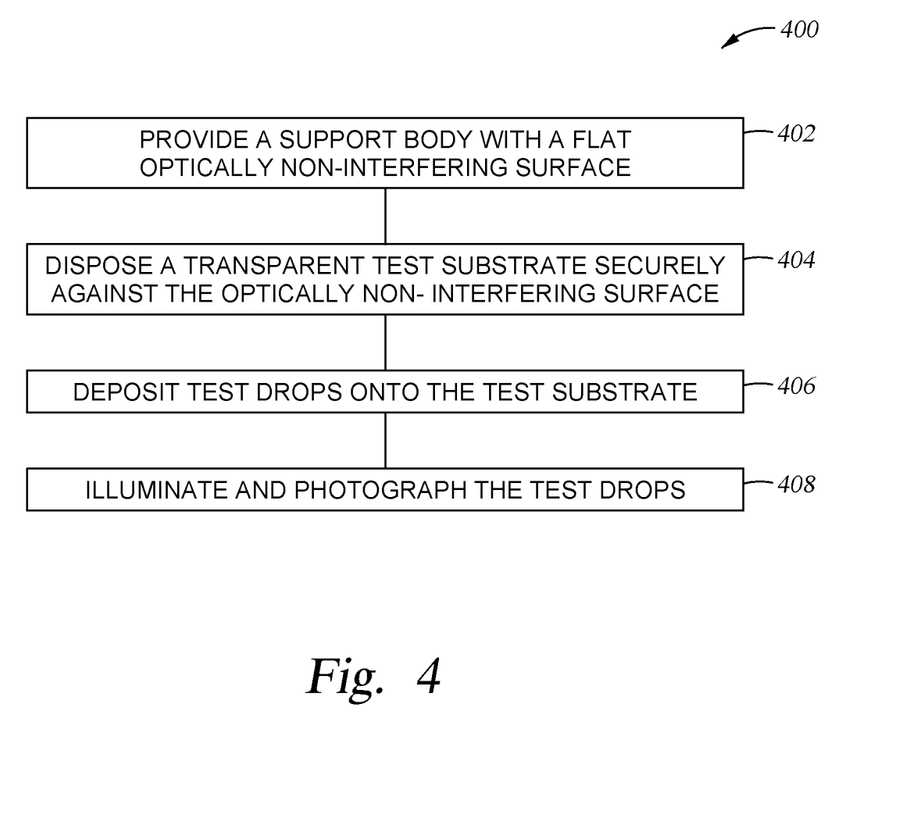
FIG. 4 is a flow diagram summarizing a method according to one embodiment.

The apparatus described herein can be used to practice a method of imaging drops placed by an inkjet printhead. FIG. 4 is a flow diagram summarizing a method 400 according to one embodiment. At 402, a support body is provided with a flat optically non-interfering surface. The optically non-interfering surface can be a vacuum surface, but in any event has the capability of immobilizing a transparent test substrate on the surface. The surface is generally highly reflective, and may be provided using a detachable body. The surface may have a "mirror finish," as described above, or may have a spectral reflectivity (a "color") that promotes clear, sharp imaging of drops on the test substrate.

At 404, a transparent test substrate is disposed securely against the optically non-interfering surface of the support body. The test substrate may be flexible, such as a polymeric material. The transparent test substrate may be disposed securely against the optically non-interfering surface of the support body by creating a pressure difference between a surface of the substrate facing away from the optically non-interfering surface of the support body and the space between the substrate and the support body. Suction can be applied to the space between the substrate and the support body, or pressure can be increased at the surface of the test substrate facing away from the support body, or both. For example, pressure can be reduced between the substrate and the support body, and the test substrate can be urged toward the support body by momentary increase of pressure on the surface facing away from the support body.

At 406, test drops are dispensed onto the test substrate. The printhead 106 (FIG. 1) is positioned at a test location to interact with the test substrate. The printhead 106, the support body, or both, may be moved during deposition of the test drops to form a desired pattern of drops on the test substrate. A test drop may be dispensed from all nozzles of the printhead 106, from a subset of the nozzles, or from one nozzle only.

At 408, the test drops are illuminated and photographed. The illumination is configured as light adapted for use with the optically non-interfering surface of the support body to minimize noise and distortion of light reflected from the optically non-interfering surface of the support body. The illumination may be mono-chromatic, and may be of a color selected to contrast with the color of the test drops deposited on the substrate to enable detection of a sharp edge with high resolution. The illumination may be pulsed or strobed, in which the illumination is active during an exposure time and inactive at other times.

While the foregoing is directed to embodiments of one or more inventions, other embodiments of such inventions not specifically described in the present disclosure may be devised without departing from the basic scope thereof, which is determined by the claims that follow.

The invention claimed is:

1. An inkjet printer, comprising:
   a processing table;
   a printhead coupled to a printhead support disposed over the processing table; and
   a drop placement analyzer with a film support that has an opaque, optically non-interfering surface for photography of drops disposed on a film, supported by the film support.

2. The inkjet printer of claim 1, wherein the optically non-interfering surface has a mirror finish.

3. The inkjet printer of claim 1, wherein the optically non-interfering surface comprises a reflective coating.

4. The inkjet printer of claim 3, wherein the film support comprises a glass body and the reflective coating is applied to the glass body.

5. The inkjet printer of claim 1, wherein the optically non-interfering surface is a vacuum surface.

6. The inkjet printer of claim 1, wherein the optically non-interfering surface is a surface of a reflective insert.

7. The inkjet printer of claim 1, wherein the optically non-interfering surface is provided by a detachable body.

8. The inkjet printer of claim 1, wherein the film support has openings in the optically non-interfering surface that fluidly communicate with a plenum inside the film support.

9. The inkjet printer of claim 8, wherein the film support comprises a cover plate that defines the plenum, and a gas fitting is attached to the cover plate.

10. A drop placement analyzer for an inkjet printer, the drop placement analyzer comprising a film support that has an opaque, optically non-interfering vacuum surface for immobilizing a film against the optically non-interfering vacuum surface and photographing drops disposed on the film.

11. The drop placement analyzer of claim 10, wherein the optically non-interfering surface has a mirror finish.

12. The inkjet printer of claim 10, wherein the optically non-interfering surface comprises a reflective coating.

13. The inkjet printer of claim 12, wherein the film support comprises a glass body and the reflective coating is applied to the glass body.

14. The inkjet printer of claim 10, wherein the optically non-interfering surface is a surface of a reflective insert.

15. The inkjet printer of claim 10, wherein the optically non-interfering surface is provided by a detachable body.

16. The inkjet printer of claim 10, wherein the film support has openings in the optically non-interfering surface that fluidly communicate with a plenum inside the film support.

17. The inkjet printer of claim 16, wherein the film support comprises a cover plate that defines the plenum, and a gas fitting is attached to the cover plate.

18. A method of processing a substrate, comprising:
providing a support body that has a flat, opaque, optically non-interfering surface;
disposing a transparent test substrate securely against the optically non-interfering surface of the support body;
dispensing test drops onto the test substrate;
illuminating the test substrate using light adapted for use with the optically non-interfering surface of the support body to minimize noise and distortion of light reflected from the optically non-interfering surface of the support body; and
photographing the test drops on the test substrate.

19. The method of claim 18, wherein the optically non-interfering surface comprises a mirror finish, a reflective coating, a vacuum surface, a reflective insert, a detachable body, openings that fluidly communicate with a plenum inside the support body, or a combination thereof.

* * * * *